Figure 1:
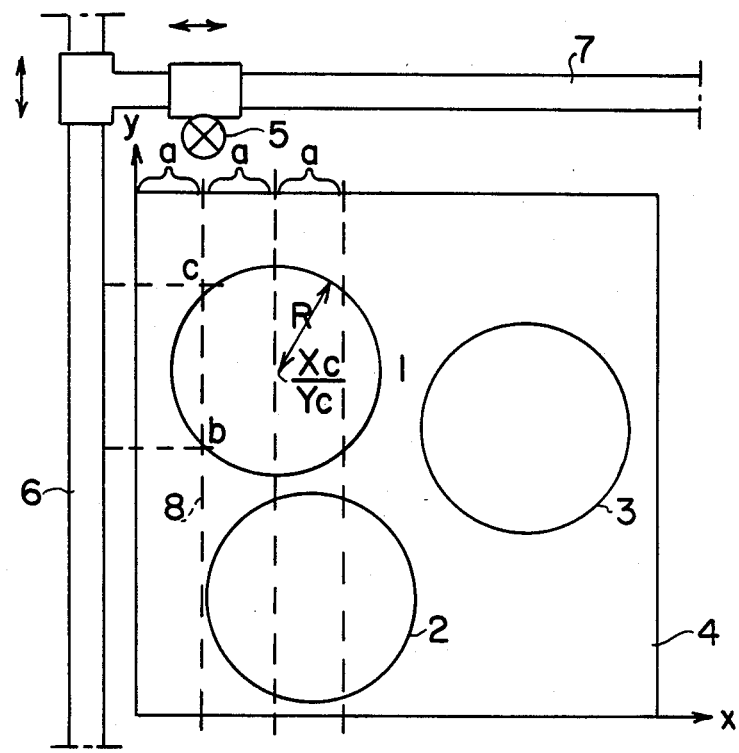

United States Patent [19]

Karlsson

[11] Patent Number: 4,521,966
[45] Date of Patent: Jun. 11, 1985

[54] METHOD AND APPARATUS FOR DETERMINING THE POSITION OF THE CENTER OF A CIRCULAR OBJECT

[75] Inventor: Thomas Karlsson, Lidköping, Sweden

[73] Assignee: Lidkopings Mekaniska Verkstads AB, Lidköping, Sweden

[21] Appl. No.: 527,799

[22] Filed: Aug. 30, 1983

[30] Foreign Application Priority Data

Sep. 14, 1982 [SE] Sweden ............... 8205233

[51] Int. Cl.$^3$ ............................................. G01B 7/28
[52] U.S. Cl. ..................................... 33/1 M; 901/46
[58] Field of Search ............. 33/1 M, 169 C; 901/46, 901/47, 35, 6; 414/730

[56] References Cited

U.S. PATENT DOCUMENTS

| | | | |
|---|---|---|---|
| 3,241,243 | 3/1966 | Speer | 33/1 M |
| 3,628,497 | 12/1971 | Neu | 33/1 M |
| 4,155,173 | 5/1979 | Sprandel | 33/1 M |
| 4,219,847 | 8/1980 | Pinkney et al. | 901/47 |
| 4,430,796 | 2/1984 | Nakagawa | 33/1 M |

Primary Examiner—Charles Frankfort
Assistant Examiner—Patrick Scanlon
Attorney, Agent, or Firm—Eugene E. Renz, Jr.

[57] ABSTRACT

The invention relates to a method and apparatus for determining the position of the center of a circular object. The object has a known diameter and is placed on a preferably flat surface. A sensor for indicating presence of an object proximate it is moved over the surface in a predetermined path comprising a number of line portions extending over the surface. The greatest distance between two adjacent line portions being less than the radius of the object. The position of the sensor in the path is measured at two points where the line portion intersects the outer contour of an object. The center of the object is determined on the basis of the two points.

6 Claims, 4 Drawing Figures

METHOD AND APPARATUS FOR DETERMINING THE POSITION OF THE CENTER OF A CIRCULAR OBJECT

The invention relates to a method and apparatus for determining the position of the center of a circular object with a known diameter situated on a generally flat surface.

So called work robots are often used for handling work pieces into and away from machines or work stations. The work pieces are preferably placed on a mainly flat surface adjacent the respective machine for generally flat orientation. Their positions on the surface are not predetermined. For a work robot to be able to pick up a work piece, the position of the work piece must be determined. The object of the present invention is to make it possible to determine easily and effectively the position of the center of a circular object with a known diameter situated on a surface. According to the invention this and other objects are achieved by a method and apparatus which moves a sensor along a known path proximate the surface containing circular objects of a known diameter. The known path includes a number of adjacent lined portions, with the greatest distance between two adjacent lined portions being less than the radius of the circular object. The position of the sensor is measured in the known path at two points where the sensor detects the circumference of the object. The center of the circular object can then be calculated by using the two measured points.

Frequently a plurality of work pieces are present on a surface relative to a machine or work station. Determining the position of each one of a number of pieces on a surface, can be accomplished according to the invention if the circular objects are non-overlapping. It is preferred that once a position has been determined that the object be removed before a subsequent position is calculated.

By employing the invention a robot, for example, can be directed to pick up an object which is randomly placed on a surface. Materials handling in connection to a machine tool can be automated in a simple and flexible way. A robot can operate more efficiently if the position of the object has been determined, since the robot then does not to perform any searching motions for determining the positions of the object to be picked up.

Figure 2:
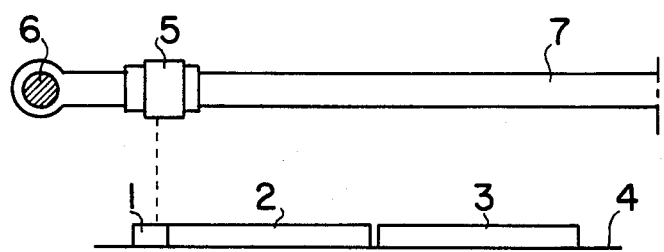

In the following, the invention is described in detail with reference to the annexed drawings, which shows the principles of the invention, in FIG. 1 in a horizontal plane,
in FIG. 2 in a vertical plane and
in FIG. 3 an alternative embodiment in a horizontal plane.

A number of circular work pieces 1, 2, 3 are situated on a surface 4, preferably flat. A sensor 5, for example in inductive, capacitive or optical sensor for indicating presence of an object under or proximate it, is attached to a path movement device. In the embodiment shown in FIGS. 1 and 2 the path movement device is in the form of a slide 6 along which another slide 7 is displaceable. Slide 7 is arranged at an angle generally orthogonal to the slide 6. The sensor 5 is displaceable along the slide 7. With this device the sensor 5 can be moved over the surface 4 along a path comprising a number of straight line portions extending over the surface, the greatest distance "a" between two adjacent line portions being less than the radius "R" of the objects whose centers are to be determined. The position of the sensor 5 in the path is measured by suitable means, e.g. by measuring the position of the slide 7 on the slide 6 and the position of the sensor 5 on the slide 7.

The position of the sensor 5 is determined in two points where the path intersects the outline of an object situated under the sensor, whereby the sensor emits an indication impulse. With knowledge of the positions of these points and of the diameter of the outline of the object the positions of the center of the object on the surface 4 can be determined. If the surface 4 is defined by the orthogonal co-ordinate axes X and Y, the indicated intersecting points for the outline of the object 1 and the path of the sensor 5 are "b" and "c", the line portions are parallel to the y-axis, and the distance between two path portions is "a" then:

$$x_c = n \cdot a + \sqrt{R^2 - \frac{(c-b)^2}{4}}$$

$$y_c = \frac{c+b}{2}$$

Wherein n=number of path portions from X=O and $X_c$, $Y_c$ are the coordinates of the center of the object 1.

A device for controlling a robot arm to move to the position $X_c/Y_c$ for picking up the indicated object which is capable of solving the above equations, can be connected to the means for measuring the position of the sensor 5 in the path. When the positions "b" and "c" are indicated by the invention a determination of the position $X_c/Y_c$ can be made by the controlling device since the path and the diameter of the object are known.

Figure 3:
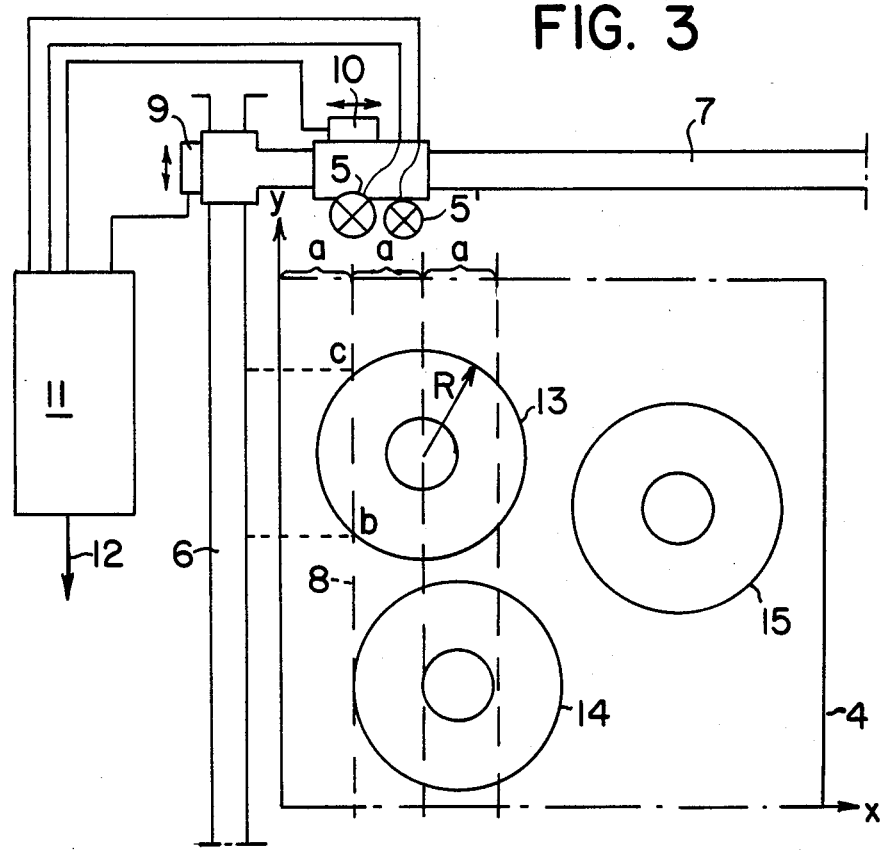

In a further embodiment shown in FIG. 3, position indicators such as position encoders 9, 10 are attached to slide 7 and sensor 5 respectively. Connected to sensor 5 and position encoders 9 and 10 is a calculating device 11. This device can be any one of several calculation devices well known in the art, such as a micro-processor, which is capable of solving the X and Y coordinate equations listed above. Accordingly, when sensor 5 indicates that it is passing over a circular object, calculator device 11 will sample the position encoder signals. Once two points have been established, the calculator can then determine the center of the circular object. This result is output on line 12 to an appropriate robot controlling device.

A plurality of objects are frequently simultaneously situated on the surface 4 which is scanned by the sensor 5. In such a case, the objects must not overlap otherwise the sensor 5 may pass more than one object without an indication, of the outline of the object. This results in a false determination of the centers of the overlapping objects.

Further, with a plurality of objects simultaneously on surface 4, it is preferable that an object be removed as soon as its position is determined, so that it is not passed by the sensor 5 several times. If several position indications were allowed, then complicated arrangements would be necessary in order to determine which indications belonged to the same object. Such arrangements are possible, however, and may be useful if for example more than one robot picks up objects from the same surface.

There is shown in FIG. 3, a system and apparatus in accordance with the present invention for locating the center of an annular object such as a ring of a bearing having known inner and outer radii $R_i$ and $R_o$. The general arrangement is similar to that described above in connection with the embodiments of FIGS. 1 and 2; however, in this instance the system includes two sensors 5, 5' spaced apart along a predetermined axis A having a maximum distance D slightly greater than the difference D1 between the inner and outer radii $R_i$ and $R_o$ of the annular object 13. Position encoders 9, 10 are only sampled when calculator device 11 detects activation of both sensors 5, 5'. In other words, sensor position indication is carried out only when both sensors are actuated or are sensing a solid portion of the annular member or ring 13 and as in the previously described embodiment only two points b and c are established which in accordance with the previous equations permits determination of the center of the ring 13.

Figure 4:
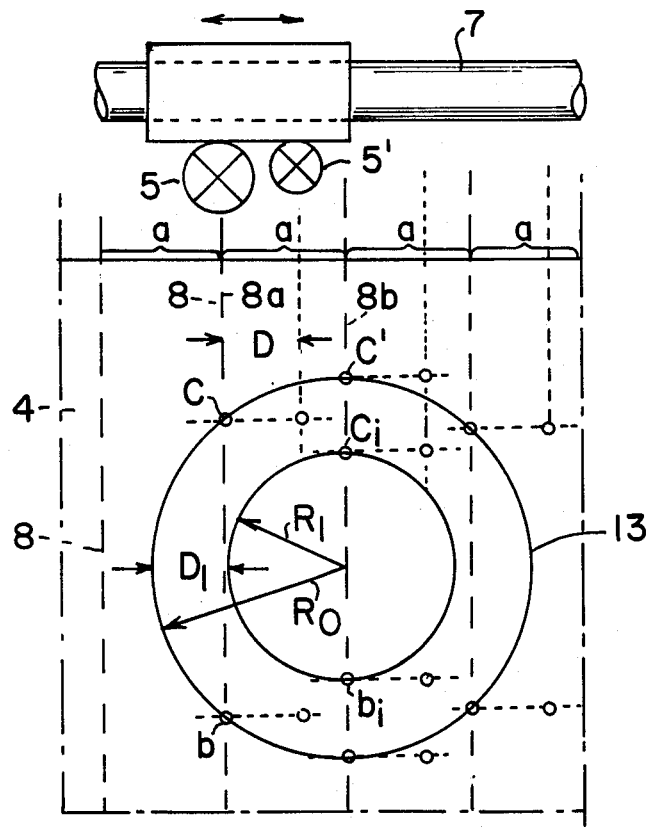

Assuming the sensor 5 is in the position indicated in FIG. 4 aligned with the first straight line path 8a. As the sensor is moved across the conveyor along this path, the sensor 5 is activated when it reaches the point c of the ring 13 since in this position the sensor 5' overlies the ring 13 and is, therefore, activated. As the sensor 5 is moved further along the path 8a to the position b, it is again activated to pick up the second point on the outer circumference since at this location the sensor 5' also overlies the ring 13 and is activated. Note that when the sensor 5 traverses the path 8b which in this instance is through the center of the ring 13, when it reaches the outer circumference of the ring 13 at the point c', the sensor 5 would not be activated since the sensor 5' does not overlie the ring 13. However, when the sensor 5 intercepts the inner circumference at the point $c_i$, the sensor 5' overlies the ring 13 and therefore, the sensor 5 is activated. Sensor 5 is likewise activated as it intercepts the inner circumference at point $b_i$. Points $b_i$ and $c_i$ permit location of the center of the ring 13 by the above equation. The spacing of the sensors 5 and 5' and the paths 8 by the increment "a" thus assures proper readings for determination of the center of an annular ring 13 anywhere on the conveyor surface.

Also other embodiments of the invention than the one described are possible within the scope of the claims. Thus, the lines 8 do not have to be parallel to the edges of the surface 4, nor do they have to be parallel to each other. However, the greatest distance between adjacent lines always has to be less than the radius of the object whose position is to be determined. The device used for moving the sensor 5 over the surface 4 can thereby be of a type different from the one described, e.g. in the shape of a single slide along which the sensor 5 can be moved and which can be pivoted at one end so that it sweeps over the whole surface. In such a case the co-ordinates for the indicated points can be related to the position of the sensor 5 on the slide and to the angle of the slide to a given reference position, for example, a reference plane passing through the pivot point. The method is applicable also in connection other than materials handling by robots.

I claim:

1. Method of determining the position of the center of a circular object with a known diameter on a generally flat surface comprising the steps of:
    sequentially moving a sensor along a plurality of know paths proximate said surface, each said path comprising a line portion, with the greatest distance between two adjacent line portions being less than the radius of said circular object;
    measuring the position of the sensor at two points in the same line portion where said sensor passes over the circumference of said object between said sensor and said surfaces; and
    calculating the position of the center of said object using the measured positions of the sensor at said two points.

2. Method according to claim 1 wherein the positions of the centers of a plurality of circular, non-overlapping, objects is to be determined further comprising the step of removing an object from said surface after its position is determined and before a subsequent position is determined.

3. Apparatus for determining the position of the center of a circular object with a known diameter oriented generally flat against a generally flat surface, comprising:
    a sensor for detecting the presence of an object in proximity thereto;
    path movement means operatively connected to the sensor, for sequentially moving the sensor through a plurality of know paths each of which paths comprises a line portion with the greatest distance between any two adjacent line portions being less than the radius of the circular object;
    position measuring means, operatively connected to the path movement means, for measuring the position of said sensor in said path; and
    calculator means, connected to the sensor and the position measuring means, for calculating the position of the center of the circular object in response to the sensor passing over the circumference of the circular object at two points, which two points lie in the same line portion of said path.

4. The center determining apparatus of claim 3, wherein the path movement means comprises a first slide and a second slide, the second slide being attached substantially orthogonal to the first slide such that the second slide can move along the length of the first slide.

5. The center determining apparatus of claim 4, wherein the sensor is attached to the second slide and wherein the position measuring means comprises a first position encoder attached to indicate the position of the second slide in relation to the first slide and a second position encoder attached to indicate the position of the sensor in relation to the second slide.

6. Method for determining the position of the center of an annular object, having known inner and outer radii defining inner and outer circumferences, positioned on a generally flat surface comprising the steps of:
    sequentially moving first and second sensors along a plurality of predetermined paths overlying the flat surface, each of said paths comprising a line portion with adjacent line portions of respective first and second sensor paths spaced apart a distance less than the outer radius of the annular object, said sensors spaced apart along an axis perpendicular to said paths a maximum distance slightly greater than the difference between the inner and outer radii of the annular object;
    measuring the position of one of said sensors at two spaced points in the same line portion where said one sensor detects a circumference of said object between said one sensor and the flat surface only when the other sensor also detects said object; and
    calculating the position of the center of the annular object using the measured positions of said one sensor at said two spaced points.

* * * * *